April 7, 1942.                    D. COOK                    2,278,718
                        WINDSHIELD WIPER MOTOR
                        Filed Aug. 10, 1940              2 Sheets-Sheet 1
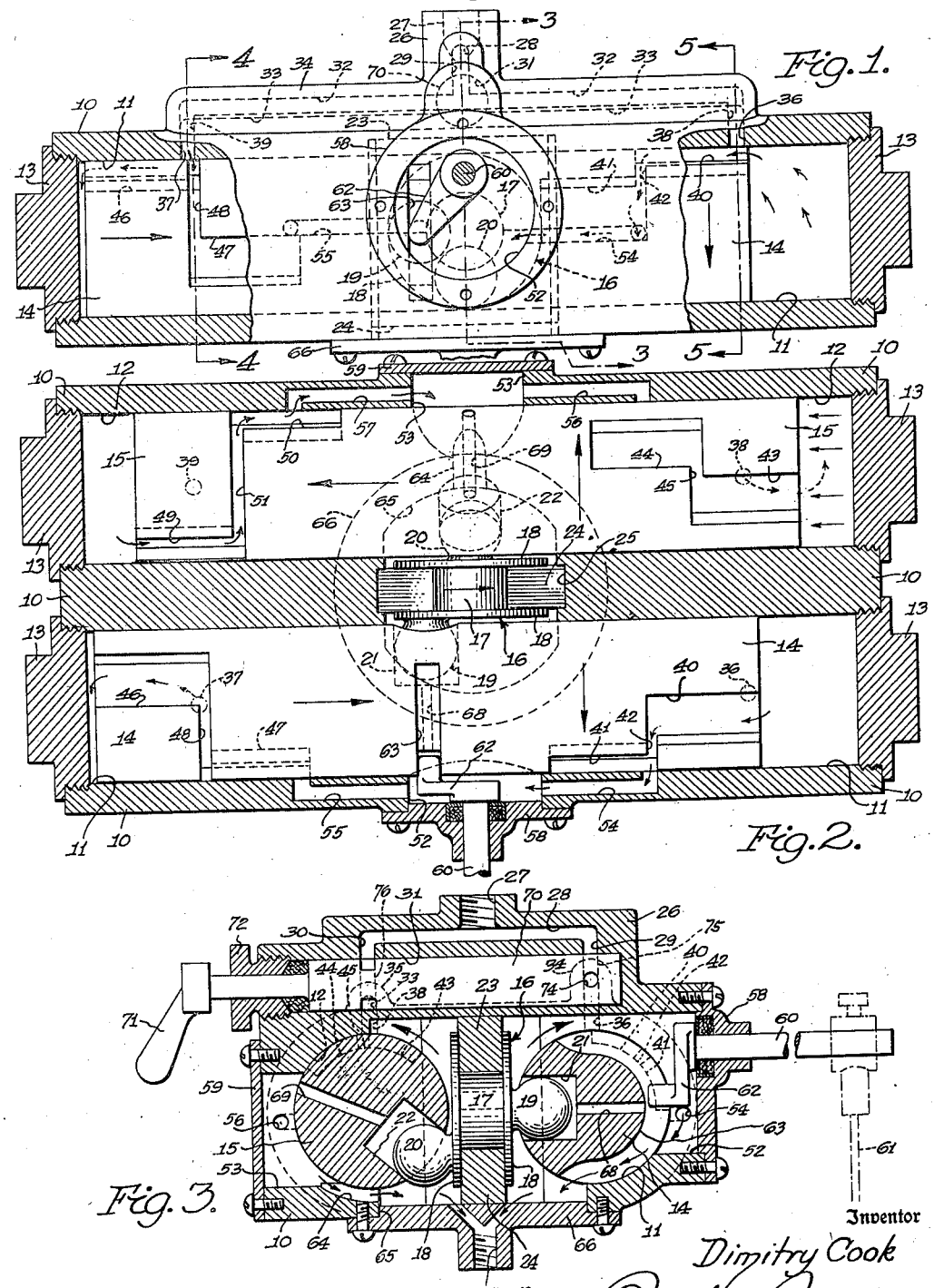
Inventor
Dimitry Cook April 7, 1942.   D. COOK   2,278,718
WINDSHIELD WIPER MOTOR
Filed Aug. 10, 1940   2 Sheets-Sheet 2
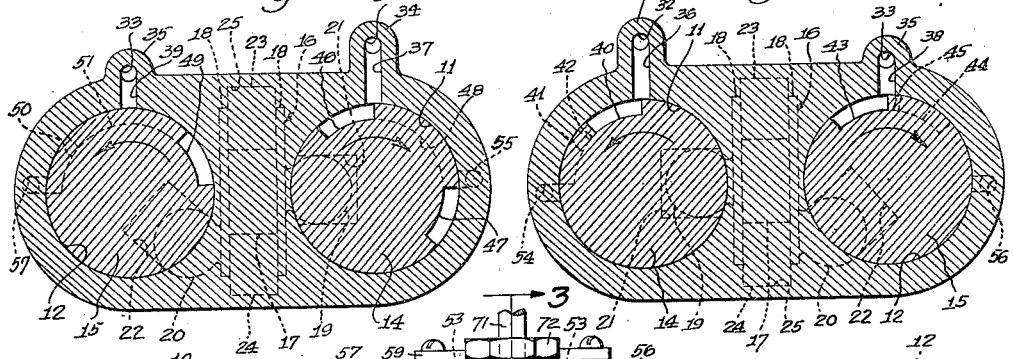

Patented Apr. 7, 1942

2,278,718

UNITED STATES PATENT OFFICE 2,278,718

WINDSHIELD WIPER MOTOR

Dimitry Cook, Detroit, Mich.

Application August 10, 1940, Serial No. 352,139

9 Claims. (Cl. 121—101)

The invention relates, in general, to windshield wiper mechanisms and, in particular, to a new and improved mechanism capable of employing positive pressures.

One of the objects of the present invention is to provide a new and improved windshield wiper mechanism having fewer movable parts than heretofore, whereby said mechanism is more easily assembled and/or disassembled, cheaper in construction, cost and maintenance, and less likely to require attention, adjustment and repair.

Another object is to provide a new and improved wiper mechanism which is more silient in operation than heretofore because of same having fewer moving parts, because of there being no escape of fluid into the atmosphere, and because of those parts which are used being constantly and thoroughly lubricated.

Another object is to provide a new and improved wiper mechanism the operating parts of which are capable of being hermetically sealed from the atmosphere.

Another object is to provide a new and improved windshield wiper mechanism which is more compact than heretofore and the rigidity of which is maximum because none of the parts employed by said mechanism are subject to being flexed, stretched, compressed, or otherwise placed under stress or strain, said mechanism employing neither springs, bellows nor the operating valves which are well recognized and universally used in the art.

Another object is to provide a new and improved windshield wiper mechanism the power output of which is maximum and wherein the movement throughout each cycle and from one cycle to another is substantially constant and regular.

Another object is to improve a windshield wiper mechanism so as to overcome the seriousness of power loss at the "dead" centers of its operation.

Another object is to provide a new and improved windshield wiper device which is adapted to a wider range of vehicle types than heretofore.

Another object is to provide a new and improved windshield wiper mechanism which may be "parked" as easily at one end of its stroke as it can at the other end thereof.

Another object is to improve the valve structure of a windshield wiper mechanism so as to minimize the number of parts comprising same, to maximize the rigidity of said parts, to obviate the necessity for the replacement of said parts and the possibility of said parts getting out of order, and to facilitate the operation thereof.

Another object is to provide a new and improved windshield wiper device wherein the faults and disadvantages herebefore found in devices of a similar nature have been easily, inexpensively, efficiently and substantially completely obviated.

Other objects and advantages of this invention will become readily apparent from a reference to the following specification taken in conjunction with the accompanying drawings of which there are two (2) sheets and wherein:

Fig. 1 is a longitudinal, vertical view of the front end of the wiper device herein described and is partly broken away and in section to illustrate more clearly some of the details of the invention incorporated therein;

Fig. 2 is a horizontal, longitudinal section taken through the device shown in Fig. 1;

Fig. 3 is a transverse section taken either along the lines 3—3 in Fig. 1 or along the lines 3—3 in Fig. 6;

Figs. 4 and 5 are transverse sections taken along the lines 4—4 and 5—5, respectively, in Fig. 1;

Fig. 6 is a plan view of Fig. 1;

Figs. 7 and 8 are views taken along the lines 7—7 and 8—8, respectively, in Fig. 6 and showing the operating and parking valve in open position;

Figs. 9 and 10 are views similar to Figs. 7 and 8, respectively, but show the valve in one of its two parking positions;

Figs. 11 and 12 are views similar to Figs. 7 and 8, respectively, but show the valve in the other of its two parking positions; and Figs. 13, 14, 15 and 16 are views looking at the left end of the front piston in either of the Figs. 1, 2 or 6 and showing the relative positions of said piston and the crank connected thereto as they appear when said piston is, respectively, at the left end of its stroke, at the center of its stroke and proceeding toward the right, at the right end of its stroke, and at the center of its stroke and proceeding toward the left.

The windshield wiper mechanism is housed within a casing 10 wherein is formed a pair of axially spaced and parallel cylinders 11 and 12 the lengths of which are preferably equal and the ends of which are closed by plates 13 either removably secured to or integral with the ends of said casing. These cylinders are non-communicative with each other except in manners which will presently be described.

Mounted in the cylinders 11 and 12 is a pair of pistons 14 and 15 each of which is equal in length to the other but substantially shorter than its respective cylinder, the difference between cylinder length and piston length substantially equalling piston stroke. Though these pistons are driven hydraulically, as will soon be seen, they are mechanically interconnected by means of a crank, generally indicated at 16, which comprises a central disc 17 on each side of which is integrally formed an outer disc 18, said discs 18 having integrally formed thereon a pair of driving pins 19 and 20 equally spaced from the axis of said disc 17 and arcuately spaced from each other a distance of approximately 90°. Pin 19 is received in an opening 21 provided therefor in the periphery of the piston 14, and pin 20 is received in an opening 22 provided therefor in the periphery of the piston 15, these connections between pins and pistons being free and universal. It is intended that crank 16 be rotatable about a non-rectilinearly movable axis, namely, the axis of the disc 17, so that pistons 14 and 15 will be moved by pins 19 and 20 both rotatably and reciprocably, and, to this end, a split bearing consisting of upper and lower sections 23 and 24, respectively, is arranged about said disc 17 and between the outer discs 18 in stationary residence within an opening 25 provided therefor in the central or cylinder-dividing wall in the casing 10. It is to be noted that the axis of the disc 17, which is the axis of the crank 16, is coincident with the intersection of a horizontal plane which includes the axes of the two cylinders 11 and 12 and a vertical plane which bisects said two cylinders. This means that, since the crank pins 19 and 20 are spaced 90° apart, when either of said pins is at either of its two extreme positions which are level with the axis of the crank 16, the respective piston will be at one of the two ends of its stroke, and the other piston will be equidistant from the two ends of its stroke.

As heretofore stated, the wiper mechanism is to be operated hydraulically, that is, by liquid pressure created preferably in the standard and well known oil system of the vehicle with which said mechanism is to be employed. To this end, the top of the casing 10 is formed centrally thereof with an integral, transversely directed boss 26 in which is provided a threaded inlet opening 27 for removably receiving the discharge end of a tube or conduit (not shown) leading from the high pressure side of the above mentioned oil system. The lower end of inlet 27 is in free communication with the center of a passageway 28 formed in the boss 26 and extending between points residing directly above the axes of the cylinders 11 and 12, the front and rear ends of said passageway having extensions 29 and 30, respectively, radially directed toward the axes of said cylinders 11 and 12, respectively. The lower ends of the passageway extensions 29 and 30 are in communication with an enlarged bore 31 formed in the boss 26 below and in parallelism with the passageway 28, said communication being selectively controlled by means of a valve received in said bore and which is subsequently to be described. Whereas the bore 31 is in communication at the upper portion thereof with the lower ends of the passageway extensions 29 and 30, the lower portion of said bore is in communication with the central portions of a pair of longitudinally extending passageways 32 and 33 formed in a pair of elongated bosses 34 and 35 which are, like boss 26, integral with the top of the casing 10, the axis of said passageway 32 being parallel with and spaced vertically above the axis of cylinder 11, and the axis of said passageway 33 being parallel with and spaced vertically above the axis of cylinder 12. The ends of the front passageway 32 are communicated with the two end portions of the front cylinder 11 by means of vertical, radially directed ports or extensions 36 and 37 formed in the casing 10 therebetween, and the ends of the rear passageway 33 are communicated with the two end portions of the rear cylinder 12 by means of vertical, radially directed ports or extensions 38 and 39 formed in said casing therebetween. It is seen, then, that the cylinders 11 and 12 are communicated with each other and with the inlet 27 by means of the passageway system just described. Further, it is to be noted that the axial distances from the ports 36, 37, 38 and 39 to the respective adjacent ends of the cylinders 11 and 12 are all equal to each other but slightly greater than the length of the respective piston stroke, so that, regardless of the relative positioning of the pistons 14 and 15, each of said pistons will extend at both of its ends outwardly beyond the respective pair of ports leading into the respective cylinder.

Looking at the right end of the device as shown in Figs. 2 and 6 toward the left end thereof, which is substantially the same as looking at Fig. 5, it will be seen that the right end of piston 14 is peripherally formed with a pair of substantially wide, axially spaced and extending grooves 40 and 41 arcuately spaced, respectively, counterclockwise and interconnected at their adjacent ends by means of a transversely extending groove 42 peripherally formed in said piston, and that the right end of piston 15 is similarly formed with grooves 43 and 44, though these latter grooves are arcuately spaced, respectively, clockwise instead of counterclockwise, as before, and are interconnected at their adjacent ends by means of a transversely extending groove 45 peripherally formed in said latter piston. As can be noted particularly in either of the Figs. 2 or 6, wherein piston 14 is shown at one of the two ends of its stroke and piston 15 is shown centrally between the two ends of its stroke, the axial length of the front wall of the groove 40 is equal to the axial length of the rear wall of the groove 43, said first mentioned length equalling the axial distance between the axis of the port 36 and the piston stroke end thereadjacent, and said second mentioned length equalling the axial distance between the axis of the port 38 and the piston stroke end thereadjacent. Then, referring to Fig. 5, it will be noted that the arcuate distance between the rear wall of groove 40 and the front wall of groove 41 is equal to the arcuate distance between the front wall of groove 43 and the rear wall of groove 44, namely, approximately 90° in each instance.

Looking now at the left end of the device as shown in Figs. 2 and 6 toward the right end thereof, which is substantially the same as looking at Fig. 4, it will be seen that the left end of piston 14 is peripherally formed with a pair of grooves 46 and 47 similar to grooves 40 and 41 but being arcuately spaced, respectively, clockwise rather than counterclockwise and interconnected at their adjacent ends by means of a transversely extending groove 48 peripherally formed in said piston, and that the left end of piston 15 is likewise formed with grooves 49 and 50 similar to grooves 43 and 44 but being arcuately spaced, respectively, counterclockwise rather than clockwise and interconnected at their adjacent ends by means of a transversely extending groove 51 peripherally formed in said latter piston. The axial lengths of the front wall of groove 46 and rear wall of groove 49 are equal to each other, to the axial lengths of the front wall of groove 40 and rear wall of groove 43, and to the axial distances between the axes of ports 37 and 39 and the respective piston stroke ends thereadjacent. Furthermore, referring to Fig. 4, it will be noted that the arcuate distance between the rear wall of groove 46 and the front wall of groove 47 is equal to the arcuate distance between the front wall of groove 49 and rear wall of groove 50, namely, approximately 180° in each instance, or double each of the corresponding distances between each respective set of groove walls at the opposite end of each piston. Still referring to Fig. 4, it will be noted that the arcuate distance between the front wall of groove 46 and the rear wall of groove 47 is equal to the arcuate distance between the rear wall of groove 49 and the front wall of groove 50, namely, approximately 90° in each instance.

The front wall of casing 10 is formed therethrough substantially centrally thereof with an opening 52 which intercommunicates the interior and exterior of the cylinder 11, and the rear wall of said casing is similarly provided with an opening 53 which intercommunicates the interior and exterior of the cylinder 12. The right side of opening 52 is in communication with the left end of a longitudinal passageway 54 which is formed in the front wall of casing 10 and in communication at its right end with the interior of cylinder 11, and the left side of said opening is in communication with the right end of a longitudinal passageway 55 which is formed in said front casing wall and in communication at its left end with said cylinder interior. The right side of opening 53 is in communication with the left end of a longitudinal passageway 56 which is formed in the rear wall of casing 10 and in communication at its right end with the interior of cylinder 12, and the left side of said opening is in communication with the right end of a longitudinal passageway 57 which is formed in said casing rear wall and in communication at its left end with said cylinder interior. As shown in Fig. 5, whereas the axes of the vertical ports 36 and 38 reside in vertical, parallel planes which include the horizontal axes of the cylinders 11 and 12, the axes of the horizontal passageways 54 and 56 are parallel with and reside below a horizontal plane which includes said cylinder axes a distance equal substantially to the radius of either of said passageways. Then, referring to Fig. 4 wherein the axes of the vertical ports 37 and 39 are shown as residing in the above mentioned vertical planes, it will be seen that the axes of the horizontal passageways 55 and 57 are parallel with and reside above the above mentioned horizontal plane a distance equal substantially to either of the above mentioned radii. In other words, the arcuate spacing between the axis of the vertical port 36 and the axis of the horizontal passageway 54 is equal to the arcuate spacing between the axis of the vertical port 38 and the axis of the horizontal passageway 56, namely, slightly greater than 90° in either instance, and the arcuate spacing between the axis of the vertical port 37 and the axis of the horizontal passageway 55 is equal to the arcuate spacing between the axis of the vertical port 39 and the axis of the horizontal passageway 57, namely, slightly less than 90° in either instance. Furthermore, referring to Figs. 2 and 6, it will be noted that the axial distance from either end of either of the cylinders 11 or 12 to the outer end of the respective passageway 54, 55, 56 or 57 is equal to any of the other similar distances and to the length of either piston stroke plus the axial distance from either end of either of the pistons 14 or 15 to the outer wall of the respective passageway 42, 48, 45 or 51. Also, it will be noted that the axial distance from either end of either of the pistons 14 or 15 to the inner circumferential wall of the respective groove 41, 47, 44 or 50 is equal to the axial distance from either end of either piston stroke to the inner circumferential wall of the portion of the respective passageway 54, 55, 56 or 57 which leads into either cylinder 11 or 12.

Openings 52 and 53 are closed by plates 58 and 59, respectively, removably secured thereabout to the casing 10, said plate 58 serving to support a rod 60 which extends therethrough and externally carries, for oscillation therewith, a wiper element 61 of any well known construction and design. Internally of the casing 10 rod 60 fixedly carries one end of a crank 62 the other end of which is freely carried within a circumferentially extending groove 63 formed centrally in the periphery of the piston 14. This connection between the piston 14 and the wiper element 61 is intended to impart oscillatable motion to the latter by and as a result of reciprocable motion of the former, it being seen that the oscillatable motion of said piston has no effect upon the oscillatable motion of said element because of the truly circumferential direction of the groove 63, the arc, therefore, to be traversed by said element being dependent exclusively upon the actual axial length of the stroke of said piston.

Whereas the opening 52 in the front wall of casing 10, which is in communication with the inner ends of the two passageways 54 and 55, is in constant communication with the groove 63, so that liquid leaving said passageways may travel toward the central lower portion of said casing, said lower portion of said casing is formed with a passageway 64 (see Fig. 3) in communication with the opening 53 in the rear wall of said casing, which is in communication with the inner ends of the two passageways 56 and 57. This lower portion of casing 10 is formed with an opening 65 which is common to both cylinders 11 and 12, said opening being removably closed by a plate 66 secured thereabout to said casing and having a Y-shaped outlet 67 formed therethrough, one leg of said outlet being in communication with said cylinder 11, another leg of said outlet being in communication with said cylinder 12, and the leg which is common to both of said first two legs being removably communicable with the low pressure side of the aforementioned oil system.

For the purpose of preventing entrapment of liquid in either of the sockets 21 or 22 behind either of the drive pins 19 or 20, each of the pistons 14 and 15 is provided with a passageway extending diametrically therethrough, passageway 68 in piston 14 extending from socket 21 to the groove 63, and passageway 69 in piston 15 extending from socket 22 to the opposite side of said latter piston.

The aforementioned valve, which is indicated at 70 and is manually operable by means of a handle 71 integrally secured thereto and extending through the rear of casing 10, is of the stem type and is rotatably received in the bore 31, it being noted that said bore extends from said casing rear to a position slightly ahead of the front, central radial port 29 and that a nut 72 is sleeved about said valve between its stem and handle and threadedly received in said casing rear for holding said valve against axial movement. The portion of valve 70 which lies directly below the front port 29 is formed with a T-shaped passageway the legs 73, 74 and 75 of which are all intercommunicated. As shown in Fig. 8, wherein valve 70 is in open position, legs 73 and 74 are in alignment with both sides of the front passageway 32, and leg 75 is in alignment with the port 29; as shown in Fig. 10, wherein valve 70 is in one "parking" position, legs 73 and 75 are in alignment with port 29 and the left side of passageway 32, the right side of said passageway being closed by said valve; and, as shown in Fig. 12, wherein valve 70 is in another "parking" position which is 180° disposed from that shown in Fig. 10, legs 74 and 75 are in alignment with port 29 and the right side of passageway 32, the left side of said passageway being closed by said valve. In other words, when valve 70 is in the open position of Fig. 8, both ends of piston 14 are in communication with inlet 27; when said valve is in the parked position of Fig. 10, only the left end of said piston is in communication with said inlet; and, when said valve is in the other parked position of Fig. 12, only the right end of said piston is in communication with said inlet.

Still referring to valve 70, the portion thereof which lies directly below the rear port 30 is flattened on each side thereof and provided with an opening 76 passing therethrough. As shown in Fig. 7, wherein valve 70 is in the same position as in Fig. 8, opening 76 is in alignment with port 30, so that the two ends of piston 15 are clearly in communication with inlet 27. On the other hand, looking at Fig. 9, which shows valve 70 in the same position as in Fig. 10, or at Fig. 11, which shows said valve in the same position as in Fig. 12, it will be noted that, though passageway 33 is cut off from inlet 27, it still remains that both ends of piston 15 are intercommunicated by means of the opening 76, said opening tending to serve as a by-pass for the liquid residing on that side of said piston toward which said piston is moved due to the parking of piston 14. In other words, when valve 70 is in the open position of Figs. 7 and 8, both ends of both pistons 14 and 15 are in communication with each other and with the inlet 27; when in the parked position of Figs. 9 and 10, only the left end of said piston 14 is in communication with said inlet, and only the two ends of said piston 15 are in communication with each other; and, when in the parked position of Figs. 11 and 12, only the right end of said piston 14 is in communication with said inlet, and only the two ends of said piston 15 are in communication with each other.

As has been said before, the front piston 14, wherever shown (except in Figs. 14, 15 and 16), is at the left end, or, in other words, at one of the two "dead centers," of its stroke, whereat the center of the crank pin 19 is at a point (see Fig. 1) on a level with a horizontal plane which includes the axis of said piston and as far to the left in a vertical plane which includes said axis as said pin reaches during its 360° arc of travel. Because of the 90° spacing between the centers of pins 19 and 20, the left end of the rear piston 15 is axially spaced from and to the right of the left end of piston 14 a distance equal to the horizontal distance between parallel, transverse, vertical planes which include said pin centers, this meaning that said piston 15 is centrally intermediate the two ends of its stroke, that said stroke (as well as the stroke of said piston 14) is equal to twice said horizontal distance, and that said center of said pin 20 is at a point in said vertical plane including same which is lowermost, as shown in Fig. 1, in the 360° arc of travel of said pin 20. In this position of the device, which can be seen best in Figs. 13, 5 and 4, and assuming valve 70 is in the open position of Figs. 7 and 8, the front inner corner of passageway 46 is on the axis of inlet port 37, so that the left end of piston 14 is subjected at this time to the oil pressure from main inlet 27; the rear inner corner of passageway 47 is just closed off from outlet port 55, so that no oil can escape from the left end of piston 14 therethrough; the rear outer corner of passageway 48 is slightly to the right of the axis of inlet port 36 and the rear wall of said passageway is on said axis, so that the right end of piston 14 is just ready to be closed off from main inlet 27; the outer walls of passageway 42 and outlet port 54 are in transverse alignment and the front outer corner of passageway 41 is just ready to be opened up to said outlet port, so that oil residing to the right of piston 14 or temporarily entering inlet port 36 may pass in toto through said outlet port; the center of the rear wall of passageway 43 is on the axis of inlet port 38, permitting the right end of piston 15 to be subjected to the oil pressure from main inlet 27; the rear wall of passageway 44 is at this time substantially spaced from outlet port 56, so that no oil escapes through said outlet port from the right end of piston 15; the rear wall of passageway 49 is substantially spaced from the axis of inlet port 39 and the center of the rear wall of passageway 50 is slightly past, arcuately, the outlet port 57, so that the oil at the left of piston 15 is free to pass in toto through said outlet port.

Still observing the momentary positions of the pistons 14 and 15 as they appear in Figs. 2 or 6, or of said piston 14 as it appears in Fig. 13, it will be noted that the existence of oil pressure on the left end of said piston 14 and on the right end of said piston 15, the communication between discharge port 54 and the right end of said piston 14 and between discharge port 57 and the left end of said piston 15, the leftwardmost position of crank pin 19 (see Fig. 1) in its arc of travel and the lowermost position of crank pin 20 (see Fig. 1) in its arc of travel all tend to indicate that said piston 14 is ready to commence longitudinal travel toward the right (as viewed in Figs. 2 or 6) and to continue clockwise travel (as viewed in Figs. 3, 4 or 13), and that said piston 15 is to continue travelling longitudinally toward the left (as viewed in said Figs. 2 or 6) and to commence counterclockwise travel (as viewed in said Figs. 3 or 4). The above stated "continuance" of the clockwise travel of piston 14 is, of course, due to the pin 19 being intermediate the lowermost and uppermost points in the arc of its travel when the rightward movement of said piston is to commence, and the above stated "commencement" of the counterclockwise travel of piston 15 is, of course, due to the pin 20 being at the lowermost point in the arc of its travel when said piston 15 is at the center of its stroke and is to continue leftwardly therefrom.

In describing the operation of the device, it is to be understood that: movement of either piston 14 or 15 to the right or to the left has reference to such movement as could be viewed by looking at Figs. 2 or 6; movement of either of said pistons clockwise or counterclockwise has reference to such movement as could be viewed by looking at the left end of either of said figures toward the right; and, any mention of crank 16 or its parts will be best understood by referring to Fig. 1 and the positions thereof attainable therein.

Longitudinal movement of piston 14 from the left end of its stroke to the center thereof, clockwise movement of said piston an arcuate distance equal to the transverse spacing between the front and rear walls of groove 46 and to the transverse spacing between the front and rear walls of groove 41, longitudinal movement of piston 15 from the center of its stroke to the left end thereof, counterclockwise movement of said piston 15 an arcuate distance equal to the transverse spacing between the front and rear walls of groove 49 and to the transverse spacing between the front and rear walls of groove 44, and clockwise movement of crank 16 into position whereat pin 19 is at the uppermost point in its arc of travel and pin 20 is at the leftwardmost point in its arc of travel, all happen concurrently and Fig. 14 is a view of said crank and the left end of said piston 14 upon fulfillment of these conditions. At this time, it is clear that the left end of piston 14 is still open to the main inlet 27 and fully closed to the outlet port 55, that the right end of said piston is fully closed to said inlet and open to the outlet port 54, that the right end of piston 15 is just ready to be closed to said main inlet and opened to the outlet port 56, and that the left end of said piston 15 is open to said inlet and ready to be fully closed to the outlet port 57.

Longitudinal movement of piston 14 from the center of its stroke to the right end thereof, a change-over from clockwise movement to counterclockwise movement of said piston and coverage by said latter movement of an arcuate distance equal to the arcuate distance covered heretofore by said former movement, longitudinal movement of piston 15 from the left end of its stroke to the center thereof, continued counterclockwise movement of said piston 15 an arcuate distance equal to the arcuate distance covered heretofore by the counterclockwise movement of said piston 15, and continued clockwise movement of crank 16 into position whereat pin 19 is at the rightwardmost point in its arc of travel and pin 20 is at the uppermost point in its arc of travel, all happen concurrently and Fig. 15 is a view of said crank and the left end of said piston 14 upon fulfillment of these conditions. At this time, it is clear that the left end of piston 14 is just ready to be fully closed to the main inlet 27 and opened to the outlet port 55, that the right end of said piston is just ready to be fully closed to the outlet port 54 and is partially open to said main inlet, that the right end of piston 15 is fully closed to said main inlet and open to the outlet port 56, and that the left end of said piston 15 is fully open to said main inlet and closed to the outlet port 57.

Longitudinal movement of piston 14 from the right end of its stroke to the center thereof, continued counterclockwise movement of said piston an arcuate distance equal to the arcuate distance covered heretofore by the counterclockwise movement of said piston, longitudinal movement of piston 15 from the center of its stroke to the right end thereof, a change-over from counterclockwise movement to clockwise movement of said piston 15 and coverage by said latter movement of an arcuate distance equal to one-half the total arcuate distance covered by the heretofore counterclockwise movement of said piston 15, and continued clockwise movement of crank 16 into position whereat pin 19 is at the lowermost point in its arc of travel and pin 20 is at the rightwardmost point in its arc of travel, all happen concurrently and Fig. 16 is a view of said crank and the left end of said piston 14 upon fulfillment of these conditions. At this time, it is clear that the left end of piston 14 is fully open to the outlet port 55 and closed to the main inlet 27, that the right end of said piston is fully open to said inlet and closed to the outlet port 54, that the right end of piston 15 is just ready to be fully opened to said inlet and closed to the outlet port 56, and that the left end of said piston 15 is just ready to be fully opened to the outlet port 57 and closed to said inlet.

Longitudinal movement of piston 14 from the center of its stroke to the left end thereof, a change-over from counter-clockwise movement to clockwise movement of said piston and coverage by said latter movement of an arcuate distance equal to one-half the total arcuate distance covered by the heretofore counterclockwise movement of said piston, longitudinal movement of piston 15 from the right end of its stroke to the center thereof, continued clockwise movement of said piston 15 an arcuate distance equal to the arcuate distance covered heretofore by the clockwise movement of said piston 15, and continued clockwise movement of crank 16 into position whereat pin 19 is at the leftwardmost point in its arc of travel and pin 20 is at the lowermost point in its arc of travel all happend concurrently and cause the return of the various elements back to the positions thereof shown in Figs. 2, 6 and 13. At this time, the relation between the left end of piston 14, the main inlet 27 and the outlet port 55, the relation between the right end of said piston, said main inlet and the outlet port 54, the relation between the right end of piston 15, said main inlet and the outlet port 56, and the relation between the left end of said piston 15, said main inlet and the outlet port 57, are all the same as they appear and are described in the fifth and sixth paragraphs next preceding.

In short, when piston 14 is moving longitudinally from the left end of its stroke to the center thereof, the direction of its rotation is clockwise, the longitudinal movement of piston 15 is from the center of its stroke to the left end thereof and the direction of its rotation is counterclockwise; when piston 14 is moving longitudinally from the center of its stroke to the right end thereof, the direction of its rotation is counterclockwise, the longitudinal movement of piston 15 is from the left end of its stroke back to the center thereof and the direction of its rotation is also and still counterclockwise; when piston 14 is moving longitudinally from the right end of its stroke back to the center thereof, the direction of its rotation is still counterclockwise, the longitudinal movement of piston 15 is from the center of its stroke to the right end thereof and the direction of its rotation is clockwise; and, when piston 14 is moving longitudinally from the center of its stroke back to the left end thereof, the direction of its rotation is once again clockwise, the longitudinal movement of piston 15 is from the right end of its stroke back to the center thereof and the direction of its rotation is still counterclockwise.

It is to be noted that the mechanism itself has only three moving parts, namely, the two pistons 14 and 15 and the crank 16, the valve 70 and the unit 62—60—61 also being movable but, of course, not in the same sense that said pistons and crank are movable, this fact necessarily meaning that the assembly and disassembly of the device are facilitated, its costs of construction and maintenance are low, and little or no attention, adjustment and repair are necessary to assure continuity in its utility and operation. Because of the number of moving parts being minimum, because said parts are constantly lubricated, and because there is no escape (either intentionally or unintentionally) into the the atmosphere of fluid from within the device, it can be said that said device is operable substantially noiselessly. Because the fluid inlet and outlet are necessarily connected to opposite sides of the pressure source, it is possible to seal the mechanism hermetically from the atmosphere because it is a simple matter to seal the only other openings into the device, namely, the opening receiving the valve 70 and the opening receiving the wiper element rod 60. As far as the compactness of the device and its rigidity are concerned, little need be said, it being obvious that said device employs nothing that stretches, flexes, bends or otherwise changes shape, there being none of the universally employed "kickers," "trippers," "bellows," etc., used herein. The power output is extremely high because the device employs positive pressures exclusively and these pressures are for the most part more effective than negative pressures, said positive pressures also rendering more even piston strokes and enabling the device to be used on many vehicles whereon devices depending for their operation upon said negative pressures cannot be used. Furthermore, the 90° spacing between the crank-piston connections absolutely negatives the serious and troublesome "dead" centers heretofore encountered in the art under observation and causes the pistons to have substantially the same power and velocity at all points in their strokes. Also, the wiper may be parked at either end of its stroke by simple manipulation of the same valve that puts it into motion, this valve, it might be said, constituting the sole valve structure of the device.

Although the invention has been described with some detail such description is for the sole purpose of illustration and is not to be taken as being definitive of the limits of the inventive idea. The right is reserved to make such changes in the details of construction and arrangement of parts as will fall within the purview of the attached claims.

What I claim is:

1. A windshield wiper device comprising, a casing having a cylinder formed therein, fluid inlet and outlet means formed in said casing in communication with said cylinder, a piston mounted in said cylinder for movement axially and rotatably relatively thereto, means formed in said piston for movement unitarily therewith and operable in one position of said piston for intercommunicating said inlet means and one end of said piston to effectuate axial movement of the latter in one direction and in another position of said piston for intercommunicating said inlet means and the other end of said piston to effectuate axial movement of the latter in the opposite direction, and means operatively connected to said piston and rotatable about a transverse axis responsive to said axial movements thereof for effectuating piston rotation.

2. A windshield wiper device comprising, a casing having a cylinder formed therein, fluid inlet and outlet means formed in said casing in communication with said cylinder, a piston mounted in said cylinder for movement axially and rotatably relatively thereto, passageway means formed in said piston and operable at one position of the latter for communicating said inlet means with one end of said piston and said outlet means with the opposite end of said piston to effectuate axial movement of said piston in one direction and at another position thereof for communicating said inlet means with said opposite end of said piston and said outlet means with said one end of said piston to effectuate axial movement of said piston in the opposite direction, and means operatively connected to said piston and rotatable about a transverse axis responsive to said axial movements thereof for effectuating piston rotation.

3. In a windshield wiper device, a casing formed with a cylinder having a central axis and with fluid inlet means and outlet means in communication with said cylinder, a piston movably carried within and in axial coincidence with said cylinder, a member mounted for rotation about an axis normal to said central axis and having a portion offset from said second-named axis and connected to said piston so that a complete revolution of said member is accompanied by an oscillation of said piston about said central axis between a pair of arcuately spaced limit positions and an oscillation of said piston along said central axis between a pair of axially spaced limit positions, and a pair of fluid ducts formed in said piston at opposite ends thereof for simultaneously communicating one of said piston ends with said inlet means and the other of said piston ends with said outlet means during said arcuate and axial travel of said piston.

4. In a windshield wiper device, a casing formed with a cylinder having a central axis and with fluid inlet means and outlet means in communication with said cylinder, a piston movably carried within and in axial coincidence with said cylinder, a disc member mounted for rotation about an axis normal to said central axis and having a portion formed thereon in radially offset relation to said second-named axis and connected into a socket provided therefor in said piston so that a complete revolution of said member is accompanied by an oscillation of said piston about said central axis between a pair of arcuately spaced limit positions and an oscillation of said piston along said central axis between a pair of axially spaced limit positions, and a pair of fluid ducts formed in said piston at opposite ends thereof for simultaneously communicating one of said piston ends with said inlet means and the other of said piston ends with said outlet means during said arcuate and axial travel of said piston.

5. In a windshield wiper device, a casing formed with a pair of cylinders having laterally spaced, central, parallel axes and with fluid inlet means and outlet means in communication with said cylinders, a pair of pistons movably carried within and in axial coincidence with said cylinders, a member carried between said pistons for rotation about an axis normal to said central axes and having portions on opposite sides thereof radially offset from said second-named axis and connected to said pistons so that a complete revolution of said member is accompanied by an oscillation of each of said pistons about the respective central axis between a pair of arcuately spaced limit positions and an oscillation of each of said pistons along the respective central axis between a pair of axially spaced limit positions, and a pair of fluid ducts formed in each of said pistons at opposite ends thereof for simultaneously communicating one end of each of said pistons with said inlet means and the other end of each of said pistons with said outlet means during said arcuate and axial travel of said pistons.

6. In a windshield device, a casing formed with a pair of cylinders having laterally spaced, central, parallel axes and with fluid inlet means and outlet means in communication with said cylinders, a pair of pistons movably carried within and in axial coincidence with said cylinders, a disc member carried between said pistons for rotation about an axis normal to said central axes and having portions formed on opposite sides thereof radially offset from said second-named axis and connected into sockets provided therefor in said pistons so that a complete revolution of said member is accompanied by an oscillation of each of said pistons about the respective central axis between a pair of arcuately spaced limit positions and an oscillation of each of said pistons along the respective central axis between a pair of axially spaced limit positions, and a pair of fluid ducts formed in each of said pistons at opposite ends thereof for simultaneously communicating one end of each of said pistons with said inlet means and the other end of each of said pistons with said outlet means during said arcuate and axial travel of said pistons.

7. In a windshield wiper device, a casing formed with a pair of cylinders having laterally spaced, central, parallel axes and with fluid inlet means and outlet means in communication with said cylinders, a pair of pistons movably carried within and in axial coincidence with said cylinders, a disc member carried between said pistons for rotation about an axis normal to said central axes and having portions formed on opposite sides thereof radially offset from said second-named axis in arcuately spaced relation to each other and connected into sockets provided therefor in said pistons so that a complete revolution of said member is accompanied by an oscillation of each of said pistons about the respective central axis between a pair of arcuately spaced limit positions and an oscillation of each of said pistons along the respective central axis between a pair of axially spaced limit positions, and a pair of fluid ducts formed in each of said pistons at opposite ends thereof for simultaneously communicating one end of each of said pistons with said inlet means and the other end of each of said pistons with said outlet means during said arcuate and axial travel of said pistons.

8. A windshield wiper device comprising, a casing having a pair of axially spaced cylinders formed therein for receiving a piston in each thereof, a pair of fluid inlet passageways formed in said casing, the two opposite ends of one of said passageways being in communication with the two opposite end portions of one of said cylinders, the two opposite ends of the other of said passageways being in communication with the two opposite end portions of the other of said cylinders, a third passageway formed in said casing and interconnecting said first two passageways intermediate the four ends of the latter, said third passageway being in communication with a source of fluid pressure, selectively movable control means carried in said third passageway and operable in one position thereof for intercommunicating said pressure source and all four end portions of said cylinders and in either of two other positions thereof for intercommunicating said pressure source and one only of said four end portions, and fluid outlet means formed in said casing.

9. A windshield wiper device comprising, a casing having a pair of axially spaced cylinders formed therein for receiving a piston in each thereof, a pair of fluid inlet passageways formed in said casing, the two opposite ends of one of said passageways being in communication with the two opposite end portions of one of said cylinders, the two opposite ends of the other of said passageways being in communication with the two opposite end portions of the other of said cylinders, a third passageway formed in said casing and interconnecting said first two passageways intermediate the four ends of the latter, said third passageway being in communication with a source of fluid pressure, selectively movable control means carried in said third passageway and operable in one position thereof for intercommunicating said pressure source and all four end portions of said cylinders and in either of two other positions thereof for intercommunicating said pressure source and one only of said four end portions, said control means being operable when in either of said last two mentioned positions for intercommunicating the two end portions of the piston out of communication with said pressure source, and fluid outlet means formed in said casing.

DIMITRY COOK.